(12) United States Patent
Odoi (10) Patent No.: US 7,963,584 B2
(45) Date of Patent: Jun. 21, 2011

(54) RETRACTABLE ROOF AND VEHICLE INCLUDING THE SAME

(75) Inventor: Kozo Odoi, Hiroshima (JP)

(73) Assignee: Webasto AG (DE)

( * ) Notice: Subject to any disclaimer, the term of this patent is extended or adjusted under 35 U.S.C. 154(b) by 183 days.

(21) Appl. No.: 12/295,002

(22) PCT Filed: Mar. 28, 2007

(86) PCT No.: PCT/JP2007/056605
§ 371 (c)(1),
(2), (4) Date: Sep. 29, 2008

(87) PCT Pub. No.: WO2007/114148
PCT Pub. Date: Oct. 11, 2007

(65) Prior Publication Data
US 2010/0176625 A1    Jul. 15, 2010

(30) Foreign Application Priority Data
Mar. 28, 2006   (JP) ................................. 2006-088518

(51) Int. Cl.
*B60J 7/08* (2006.01)
(52) U.S. Cl. ...................................................... 296/108
(58) Field of Classification Search .................. 296/108, 296/136.06, 107.01, 121, 107.07, 117, 107.17, 296/107.09, 122, 223, 107.08
See application file for complete search history.

(56) References Cited

U.S. PATENT DOCUMENTS

| 4,487,447 A | 12/1984 | Schroder | |
|---|---|---|---|
| 5,746,470 A * | 5/1998 | Seel et al. .................... | 296/108 |
| 6,299,234 B1 * | 10/2001 | Seel et al. .................... | 296/108 |
| 6,312,042 B1 * | 11/2001 | Halbweiss et al. ............ | 296/108 |
| 6,364,395 B1 * | 4/2002 | Halbweiss et al. ....... | 296/107.09 |
| 6,390,532 B1 * | 5/2002 | MacFarland ............. | 296/107.17 |
| 6,478,362 B2 * | 11/2002 | Obendiek .................... | 296/108 |
| 6,592,169 B2 * | 7/2003 | Obendiek ................ | 296/107.07 |
| 6,637,802 B2 * | 10/2003 | Obendiek .................... | 296/108 |
| 6,659,534 B2 * | 12/2003 | Willard ........................ | 296/108 |
| 6,666,495 B2 * | 12/2003 | Nania ..................... | 296/107.08 |
| 6,729,672 B2 * | 5/2004 | Neubrand ................ | 296/107.07 |
| 6,764,127 B2 * | 7/2004 | Obendiek ................ | 296/107.09 |

(Continued)

FOREIGN PATENT DOCUMENTS

FR   2 841 830 A1   1/2004

(Continued)

OTHER PUBLICATIONS

Extended European Search Report dated Dec. 21, 2009; Application No. / Patent No. 07740043.0-1268 / 2006138 PCT/JP2007056605.

(Continued)

*Primary Examiner* — Kiran B. Patel
(74) *Attorney, Agent, or Firm* — Studebaker & Brackett PC; Donald R. Studebaker (57) ABSTRACT

A retractable roof includes a roof member 2 including a front roof panel 21, a back roof panel 22, and a linkage mechanism 4 for alternately chaining the position of the roof member 2 between an in-use position and a storage position. The retractable roof further includes an adjusting mechanism 51, 52 for adjusting the geometry in the in-use state of the linkage mechanism 4 by changing the angle of the turning direction of one of links 44 included in the linkage mechanism 4 in the in-use state.

6 Claims, 9 Drawing Sheets

U.S. PATENT DOCUMENTS

| | | | |
|---|---|---|---|
| 6,767,045 B2 * | 7/2004 | Reinsch | 296/107.17 |
| 6,866,325 B2 * | 3/2005 | Willard | 296/108 |
| 6,913,306 B2 * | 7/2005 | Rosler et al. | 296/107.17 |
| 7,118,161 B2 * | 10/2006 | Neubrand | 296/107.15 |
| 7,163,255 B2 * | 1/2007 | Rawlings et al. | 296/116 |
| 7,172,235 B2 * | 2/2007 | Rosler et al. | 296/107.08 |
| 7,178,852 B2 * | 2/2007 | Obendiek et al. | 296/107.17 |
| 7,198,318 B2 * | 4/2007 | Dilluvio | 296/107.08 |
| 7,309,098 B2 * | 12/2007 | Neubrand | 296/107.17 |
| 7,331,624 B2 * | 2/2008 | Obendiek | 296/107.19 |
| 7,364,217 B2 * | 4/2008 | Obendiek et al. | 296/108 |
| 7,374,226 B2 * | 5/2008 | Obendiek | 296/121 |
| 7,401,839 B2 * | 7/2008 | Hiyama et al. | 296/108 |
| 2008/0224496 A1 * | 9/2008 | Obendiek | 296/107.17 |
| 2009/0108623 A1 * | 4/2009 | Haberl et al. | 296/109 |
| 2009/0160207 A1 * | 6/2009 | Neubrand | 296/65.01 |
| 2009/0160225 A1 * | 6/2009 | Matsui et al. | 296/223 |

FOREIGN PATENT DOCUMENTS

| | | |
|---|---|---|
| GB | 2 101 539 A | 1/1983 |
| JP | 2002-264657 A | 9/2002 |
| JP | 2002-264658 A | 9/2002 |
| JP | 2003-246222 A | 9/2003 |
| JP | 2004-331014 A | 11/2004 |

OTHER PUBLICATIONS

International Search Report for PCT/JP2007/056605 dated Jun. 25, 2007.

* cited by examiner

RETRACTABLE ROOF AND VEHICLE INCLUDING THE SAME

TECHNICAL FIELD

The present invention relates to a retractable roof and a vehicle including it.

BACKGROUND ART

For example, Patent Document 1 discloses a retractable roof changeable between an in-use position to cover the passenger compartment and a storage position to be stowed in a storage room to open the passenger compartment.

The retractable roof disclosed in the above-mentioned document includes a front roof panel, a back roof panel, and a pair of four-bar links disposed on the respective sides in the vehicle width direction of the passenger compartment. Each four-bar link includes first and second links pivotally connected to the front roof panel and a car body side member to link the car body side member to the front roof panel. The back roof panel is fixed to one of the of links of each pair.

The above linkage configuration enables the retractable roof to change its position between an in-use position in which the front roof panel covers the passenger compartment from above while the back roof panel covers the rear part of the passenger compartment and a storage position in which the front and back roof panels are stowed in a vertically overlying relationship in the storage room.

Patent Document 1: Japanese Unexamined Patent Application Publication 2002-264658

SUMMARY OF THE INVENTION

Problems that the Invention is to Solve

In the retractable roof as above, a shealing is interposed between the front roof panel and the back roof panel. When the retractable roof is in the in-use position (in an in-use state), the reactive force of the shealing works on the linkage mechanism including four pivot points. In especially the case where the rigidity of the linkage mechanism is low, the reactive force working on the linkage mechanism inhibits the linkage mechanism in the in-use state from forming a desired geometry to cause relative positional displacement between, for example, the front roof panel and the back roof panel. In other words, a step is formed between the roof panels.

To tackle this conventional problem, a shim is interposed between the links and the roof panel for fine positional adjustment of the roof panels.

The adjustment using the shim, however, requires the steps of: checking the amount of the displacement between the roof panels after all the components of the retractable roof are once mounted to a vehicle; disposing the shim corresponding to the checked displacement amount after taking off the roof panels fixed to the links; and then fixing again the roof panels to the links. This is considerably bothersome operation. Moreover, such bothersome adjustment using the shim must be carried out for every vehicle one by one.

Means for Solving the Problems

The present invention has been made in view of the foregoing and has its object of facilitating positional adjustment of a roof member in an in-use state of a retractable roof.

In one aspect of the present invention, a retractable roof includes: a roof member for covering a passenger compartment; and a linkage mechanism for alternately changing a position of the roof member between an in-use position in which the roof member covers the passenger compartment and a storage position in which the roof member is stowed in a storage room formed at the rear of the passenger compartment to open the passenger compartment.

The linkage mechanism includes four or more links pivotally connected to each other, thereby including four or more pivot points.

The above retractable roof further includes an adjusting mechanism for adjusting, in an in-use state when the roof member is in the in-use position, a geometry in the in-use state of the linkage mechanism by changing an angle of a turning direction of one of the links included in the linkage mechanism.

The linkage mechanism includes the four or more links pivotally connected to each other, thereby including the four or more pivot points. In this linkage mechanism, change in angle of the turning direction of any one of the links changes the geometry of the linkage mechanism.

The linkage mechanism in the above arrangement includes the adjusting mechanism which changes the angle of the turning direction of one of the links when the roof member is in the in-use position (in the in-use state). This changes the geometry of the linkage mechanism to change accordingly the position of the roof member connected to the linkage mechanism.

In the above arrangement, the position of the roof member is adjusted by adjusting the geometry of the linkage mechanism, which enables positional adjustment of the roof member with the linkage mechanism and the roof member left mounted to the vehicle. Accordingly, different from adjustment using the shim, it is needless to take off the roof member after the linkage mechanism and the roof member are mounted thereto. As a result, positional adjustment for displacement of the roof member, which is caused due to the presence of the reactive force of the shoaling and other forces, is facilitated remarkably when compared with the conventional case.

Herein, the adjusting mechanism may include a rotating member which is attached pivotally about a predetermined rotation axis to one of two links included in the linkage mechanism and pivotally connected to each other and which has an outer peripheral face in contact with the other of the two links in the in-use state, the rotation axis of the rotating member being eccentric to the center of the outer peripheral face, while the adjusting mechanism rotates the rotating member to change a distance between the face in contact with the other link and the rotation axis, thereby changing an angle of a turning direction of the other link in the in-use state.

With the above arrangement, only rotation of the rotating member changes the angle of the turning direction of the link (the other link) in the in-use state, thereby changing the geometry of the linkage mechanism. Hence, the positional adjustment for displacement of the roof member is further facilitated.

The other link may include a lever flange part integrally formed therewith in the vicinity of a pivot point thereof, while the rotating member is in contact with the lever flange part on an opposite side of the pivot point to the other link.

With the above arrangement, rotation of the eccentric rotating member changes the distance between the lever flange part integrally formed with the link and the rotation axis of the rotating member, thereby changing the angle of the turning direction of the link in the in-use state. In this arrangement, the rotating member is arranged away from the region where the link is rotated to involve no interference of the rotating member with the operation of the linkage mechanism.

The roof member may include a front roof panel for covering the passenger compartment from above, a back window for covering a rear part of the passenger compartment, and a middle roof panel disposed between the back window and the front roof panel, while the linkage mechanism includes: a window link lever pivotally connected to the back window and a car body side member; and a pair of link levers pivotally connected to the back window and the middle roof panel to constitute a four-bar link and the adjusting means changes an angle of a turning direction of the window link lever in the in-use state.

In the above arrangement, the reactive force of the shealing interposed between the back window and the middle roof panel works on the linkage mechanism including the window link lever and the pair of the link levers. This linkage mechanism includes the four-bar link interposed between the back window and the middle roof panel and has therefore low rigidity. For this reason, the linkage mechanism may not form a desired geometry in the in-use state to invite displacement of the back window with respect to the middle roof panel.

The adjusting mechanism, however, changes the angle of the turning direction of the window link lever in the in-use state to adjust the position of the back window, thereby canceling the step between the back window and the middle roof panel.

The linkage mechanism may further include: a control link pivotally connected to one of the pair of link levers or the back window and pivotally connected to the front roof panel; and a main link pivotally connected to the front roof panel and the car body side member.

The above linkage mechanism further includes the control link and accordingly receives not only the reactive force of the shealing interposed between the back window and the middle roof panel but also the reactive force of the shealing interposed between the front roof panel and the middle roof panel.

The adjusting mechanism, however, changes the angle of the turning direction of the window link lever in the in-use state to adjust the position of the back window against not only the reactive force of the shealing interposed between the back window and the middle roof panel but also the reactive force of the shealing interposed between the front roof panel and the middle roof panel. As a result, the step formed between the back window and the middle roof panel is canceled.

A vehicle including the above retractable roof can adjust positional displacement of the roof member with the retractable roof, which includes the linkage mechanism and the roof member, left mounted to the vehicle, thereby remarkably facilitating adjustment for positional displacement of the roof member when compared with the conventional case.

EFFECTS OF THE INVENTION

As described above, in the retractable roof and the vehicle including it in accordance with the present invention, the position of the roof member in the in-use state can be adjusted by the adjusting mechanism, thereby remarkably facilitating adjustment for positional displacement of the roof member when compared with conventional adjustment using the shim.

INDEX OF REFERENCE NUMERALS

BEST MODE FOR CARRYING OUT THE INVENTION

An embodiment of the present invention will be described in detail below with reference to the drawings. The following description of the preferred embodiment is merely illustrative in nature and is not intended to limit the scope, applications, and use of the present invention.

Figure 1:
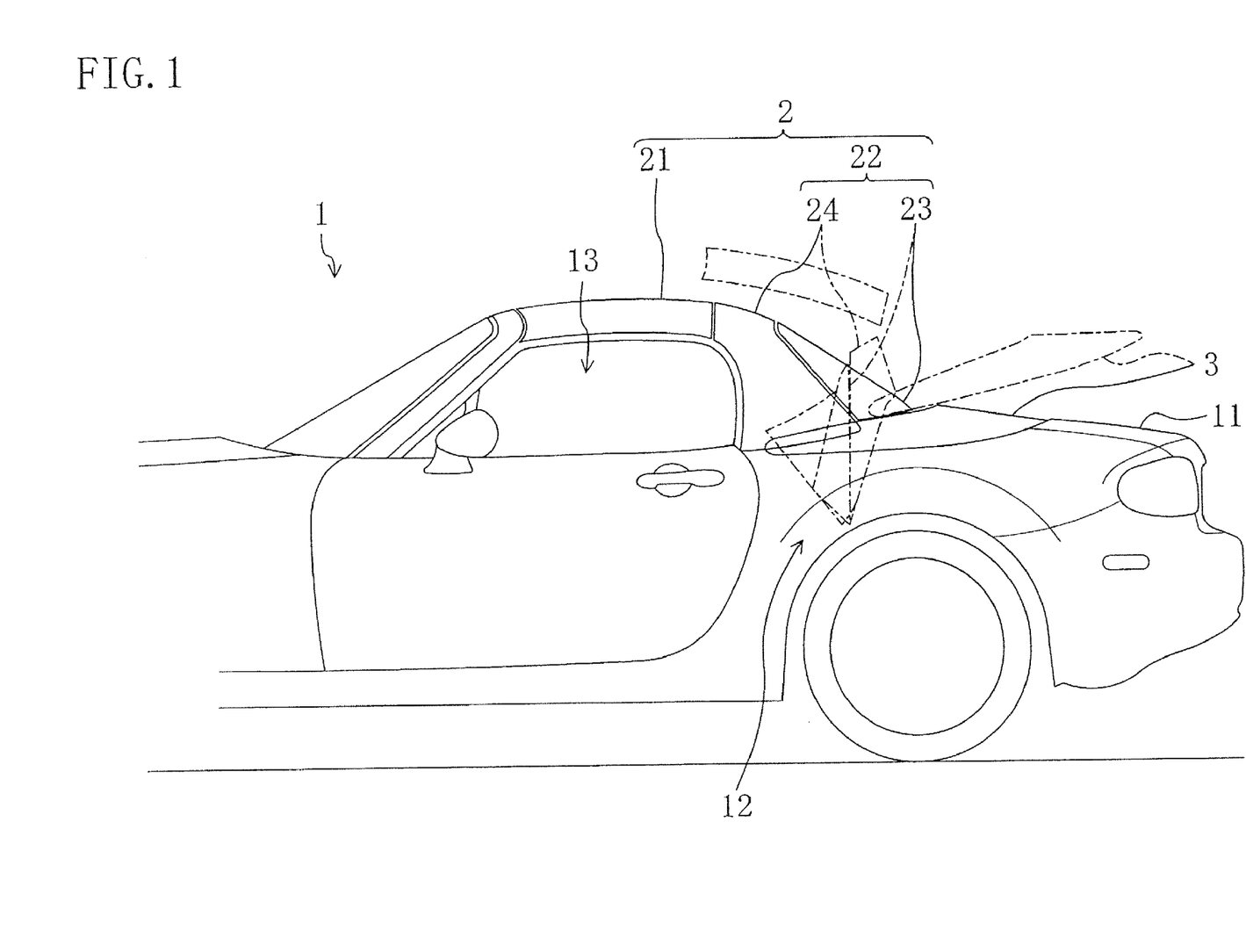
FIG. 1 is a side view of a vehicle in a state where a retractable roof is at an in-use position.
Figure 2:
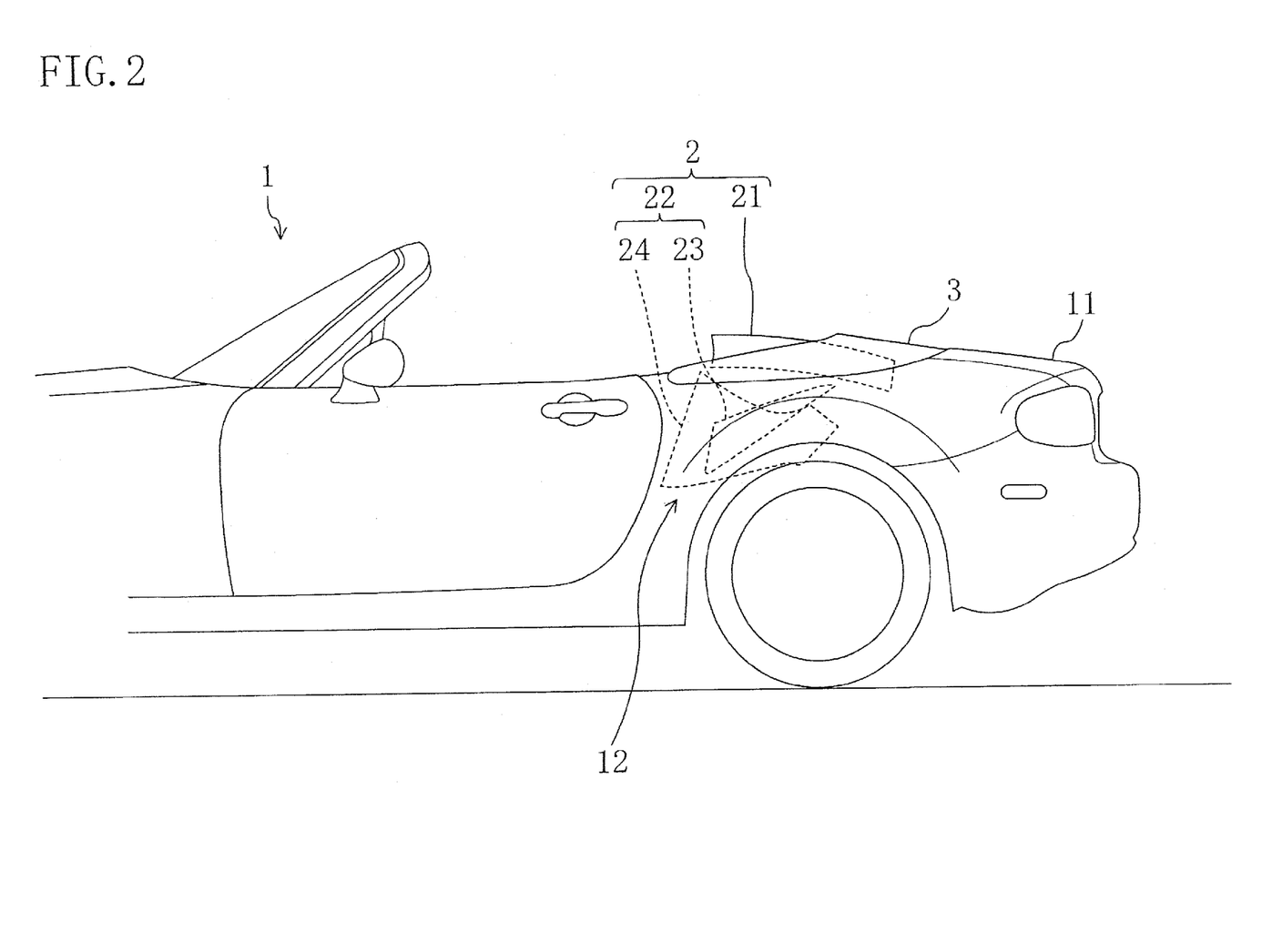
FIG. 2 is a side view of the vehicle in a state where the retractable roof is at a storage position.

FIG. 1 and FIG. 2 are side views schematically showing a vehicle 1 on which a retractable roof according to the present invention is boarded. The retractable roof (roof member) 2 includes a front roof panel 21 for covering a passenger compartment from above and a back roof panel 22, disposed at the rear of the front roof panel 21, for covering the rear part of the passenger compartment 13. The back roof panel 22 includes a back window 23 made of a transparent material and a middle roof panel 24 disposed between the front roof panel 21 and the back window 23 to constitute a pillar for the vehicle 1.

Each of the front and middle roof panels 21 and 24 is formed by joining an outer panel layer 25 forming the outer surface of the roof to an inner panel layer 26 arranged on the vehicle interior side of the outer panel layer 25. A plate-shaped reinforcement 27 is appropriately provided between the outer and inner panel layers 25 and 26 (see FIG. 6). The outer and inner panel layers 25 and 26 are made of, for example, resin, while the reinforcement 27 is made of metal. Thus, the retractable roof 2 can be saved in weight.

A trunk room is formed in the rear part of the vehicle 1, and the opening of the trunk room is closed by an openable trunk lid 11. Between the passenger compartment 13 and the trunk room, a storage room 12 for stowing the retractable roof 2 is formed open upward.

A deck lid 3 is disposed at the upper end opening of the storage room 12. When the retractable roof 2 covers the passenger compartment 13 (i.e., when it is in an in-use position as will be described later), the deck lid 3 is positioned between the rear edge of the roof 2 and the opening edge of the storage room 12. Thus, the deck lid 3 closes part of the upper end opening of the storage room 12.

The retractable roof 2 is changeable in position, by a linkage mechanism not shown in FIG. 1 and FIG. 2, between an in-use position to cover the passenger compartment 13 (see FIG. 1) and a storage position to set the passenger compartment 13 open by being stowed in the storage room 12 (see FIG. 2). The deck lid 3 is also changeable in position, by another linkage mechanism (not shown) different from the linkage mechanism for position change of the retractable roof 2, between a home position to cover part of the upper end opening of the storage room 12 (see FIG. 1 and FIG. 2) and a back-off position to be backed off rearward and diagonally upward from the home position to set the upper end opening of the storage room 12 open (see the dot-dash lines in FIG. 1).

A brief description will be given here of the position change operation of the retractable roof 2, i.e., the operation for changing the retractable roof 2 from its position to cover the passenger compartment 13 to its position to set the passenger compartment 13 open, with reference to FIG. 1 and FIG. 2. First, the deck lid 3 is moved, by the associated linkage mechanism, from its home position shown by the solid lines in FIG. 1 to its back-off position shown by the dot-dash lines in FIG. 1 to set the upper end opening of the storage room 12 open. Simultaneously therewith or after a predetermined time elapses, the linkage mechanism for the retractable roof 2 operates to turn the middle roof panel 24 backward (clockwise in FIG. 1) about a predetermined pivot axis, thereby allowing the front roof panel 21 to slide rearward and diagonally upward. Also, the back window 23 moves downward while moving frontward relative to the middle roof panel 24 (see the dot-dash lines in FIG. 1).

When the linkage mechanism for the retractable roof 2 further operates, as shown by the partly broken lines in FIG. 2, the front and middle roof panels 21 and 24 are stowed in a vertically overlying relationship into the storage room 12. At this time, the back window 23 is brought into a superposed relationship with the middle roof panel 24 as viewed along an axis extending in the vehicle widthwise direction (as viewed in the state shown in FIG. 2).

After the retractable roof 2 is stowed in the storage room 12, the linkage mechanism for the deck lid 3 operates to move the deck lid 3 from its back-off position to its home position, thereby closing part of the storage room 12. Thus, the passenger compartment 13 is opened.

On the other hand, for changing the retractable roof 2 from its position to set the passenger compartment 13 open to its position to cover the passenger compartment 13, the above operation is reversed.

Figure 3:
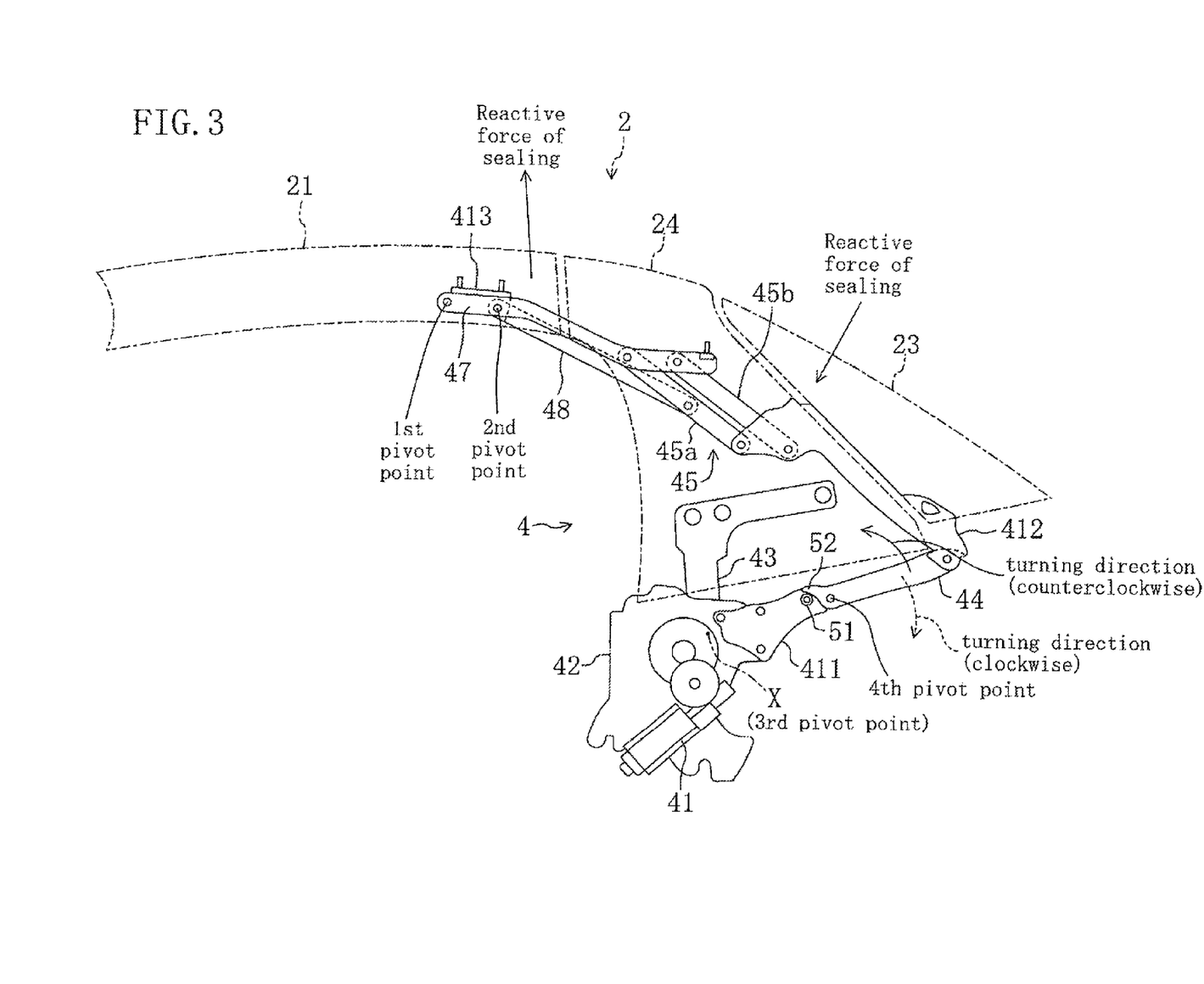
FIG. 3 is a side view showing a linkage mechanism of the retractable roof at the in-use position.
Figure 4:
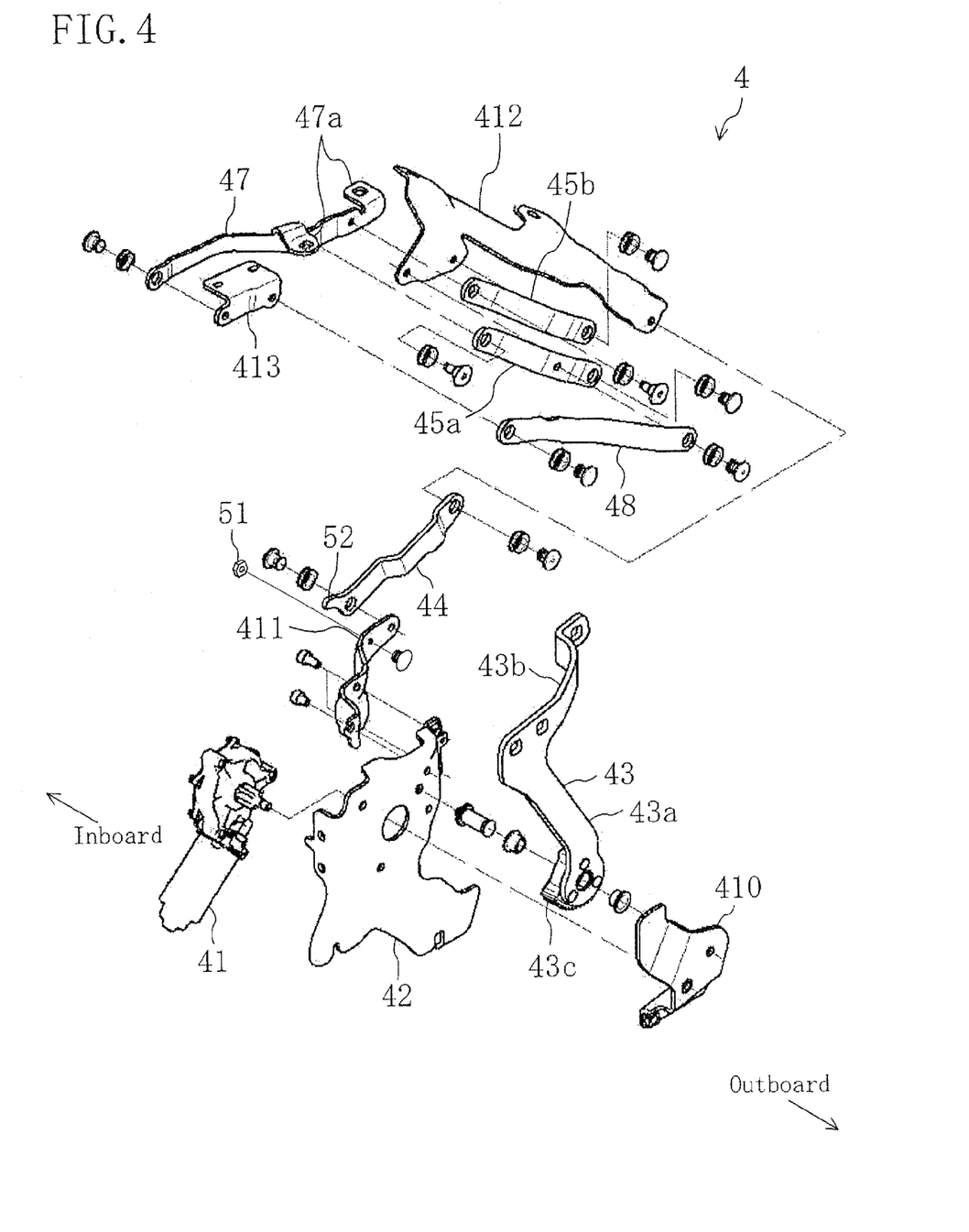
FIG. 4 is a exploded perspective view of the linkage mechanism.
Figure 5:
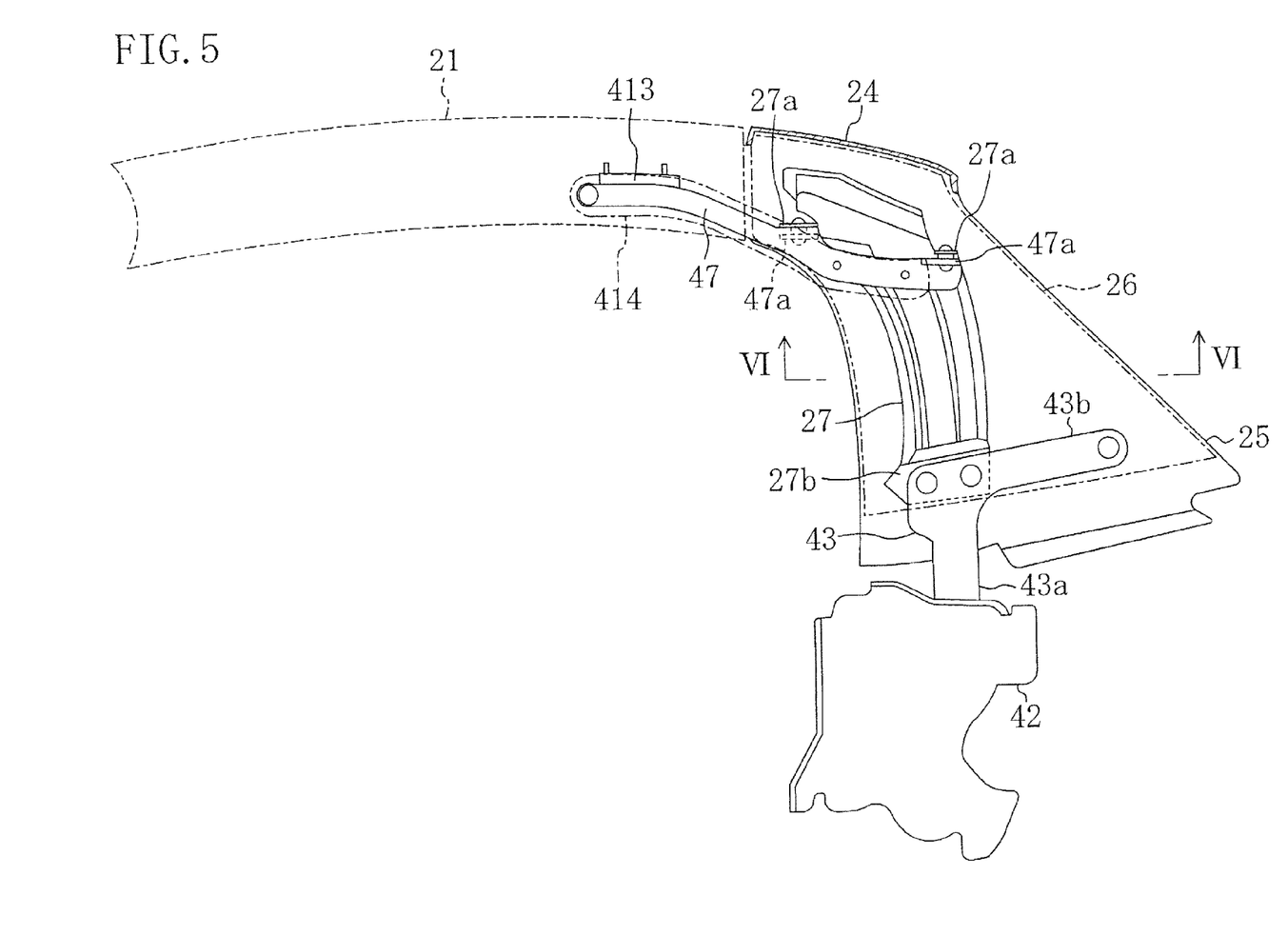
FIG. 5 is a side view showing a structure of a segmental link.

FIG. 3 to FIG. 5 illustrate the linkage mechanism 4 for the retractable roof 2. The linkage mechanism 4 is disposed on each side in the vehicle widthwise direction of the interior space of the retractable roof 2. Note that FIG. 3 and FIG. 5 are side views of the linkage mechanism 4 disposed on the right side in the vehicle widthwise direction of the interior space of the retractable roof 2 as viewed from the left side of the vehicle 1, and FIG. 4 is a perspective view showing the linkage mechanism 4 in disassembled form, which is to be disposed on the left side in the vehicle widthwise direction of the interior space of the retractable roof 2.

The linkage mechanism 4 includes a four-bar link essentially formed of first and second links each pivotally connected to the front roof panel 21 and a car body side member.

The linkage mechanism 4 is of electric motor-driven type in this embodiment. A drive motor 41 serving as a drive source is fixed by means of a bolt or the like to a main bracket 42 fixed to the vehicle 1. The main bracket 42 is a member having substantially a plate shape and is disposed in the storage room 12. Thus, the main bracket 42 is located below the middle roof panel 24 when the retractable roof 2 is in its in-use position (see FIG. 3).

A lower arm 43 is attached to the vehicle exterior side of the main bracket 42. The lower arm 43 is sandwiched between the main bracket 42 and a base plate 410, so as to be attached thereto for pivotal movement relative to the main bracket 42 about a pivot axis X extending in the vehicle widthwise direction.

Figure 9:
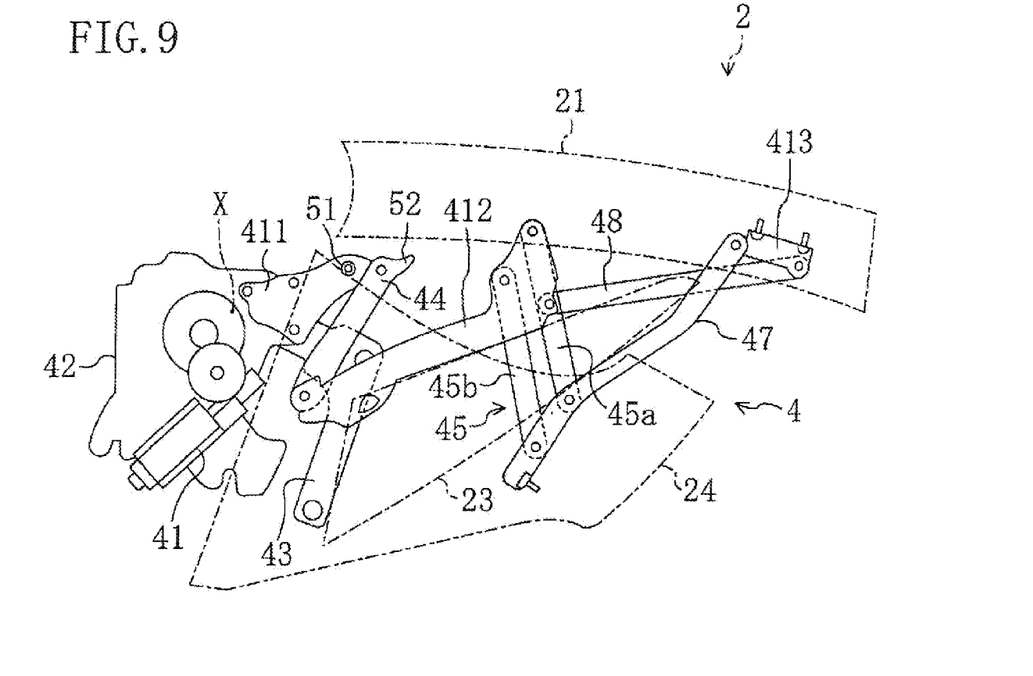
FIG. 9 is a side view showing the linkage mechanism of the retractable roof at the storage position.

The lower arm 43 includes an arm body 43a extending vertically and a fixed part 43b bent from the upper end part of the arm body 43a and fixed to the middle roof panel 24 as will be described later. A speed reduction gear 43c is fixed to the root end part of the arm body 43a so as to mesh with a drive gear mounted on the drive shaft of the drive motor 41. Thus, when the drive motor 41 is driven, the lower arm 43 turns about the pivot axis X between a position where the arm body 43a stands upright as shown in FIG. 3 and a position where the arm body 43a falls down rearward as shown in FIG. 9.

To the main bracket 42, a window bracket base 411 is also fixed which extends rearward and diagonally upward from the rear end part in the vicinity of the upper end of the main bracket 42. A window link lever 44 is pivotally connected to the rear end part of the window bracket base 411.

Through holes are formed at the front end part and the rear end part of the window link lever 44. The window link lever 44 is fixed to the rear end part of the window bracket base 411 by means of a bolt or the like with a bush inserted in the through hole at its front end part. Thus, the window link lever 44 is pivotally rotatable relative to the window bracket base 411 about an axis extending in the vehicle widthwise direction.

A window bracket 412 is fixed to each end part in the vehicle widthwise direction of the back window 23. The rear end part of the window link lever 44 is pivotally connected to the lower end part of the window bracket 412. Specifically, the window link lever 44 is attached to the lower end part of the window bracket 412 by means of a bolt or the like with a bush inserted in the through hole at its rear end part. Thus, the window link lever 44 is pivotally movable about an axis extending in the vehicle widthwise direction relative to the window bracket 412, namely, relative to the back window 23.

The upper end part of the window bracket 412 has two mounting holes formed with a specified distance left from each other in the front-to-rear direction. First and second link levers 45a and 45b are pivotally connected to the window bracket 412 at the two mounting holes.

The first and second link levers 45a and 45b are link levers having substantially the same length and are arranged alongside each other in the vehicle front-to-rear direction to have a rising gradient towards the front when the retractable roof 2 is in its in-use position. Each of the first and second link levers 45a and 45b has through holes formed at its upper and lower end parts. The first and second link levers 45a and 45b are mounted to the upper end part of the window bracket 412 by means of bolts or the like with bushes inserted in the through holes at their lower end parts. Thus, the first and second link levers 45a and 45b are pivotally movable relative to the window bracket 412 about their axes extending in the vehicle widthwise direction. In other words, they are pivotally connected to the back window 23.

Fixed to the upper end part of the middle roof panel 24 is an upper arm 47 extending frontward towards the front roof panel 21, as will be described later. The upper end parts of the first and second link levers 45a and 45b are pivotally connected to the upper arm 47. Specifically, the first and second link levers 45a and 45b are fixed to the rear end part of the upper arm 47 by means of bolts or the like with bushes inserted in through holes formed at their upper end parts. Thus, the first and second link levers 45a and 45b are pivotally movable relative to the upper arm 47 about their axes extending in the vehicle widthwise direction. In other words, the first and second link levers 45a and 45b are pivotally connected to the middle roof panel 24.

In this manner, the first and second link levers 45a and 45b are pivotally connected to the middle roof panel 24 and the back window 23. Accordingly, the first and second link levers 45a and 45b lie between the middle roof panel 24 and the back window 23 to function as the four-bar link (a secondary four-bar link 45) for restricting the relative movement of the middle roof panel 24 and the back window 23.

A front roof bracket 413 is fixed to the vicinity of the rear end of the front roof panel 21. The front end part of the upper arm 47 is pivotally connected to the front roof bracket 413. Specifically, the upper arm 47 has a through hole formed at its front end part and is fixed to the front roof bracket 413 by means of a bolt or the like with a bush inserted in this through hole. Thus, the upper arm 47 is pivotally movable relative to the front roof bracket 413 about an axis extending in the vehicle widthwise direction. In other words, the upper arm 47 is pivotally connected to the front roof panel 21.

The front roof bracket 413 has another mounting through hole formed at the rear of the pivotal point (the mounting hole) of the upper arm 47. To this mounting through hole of the front roof bracket 413, the upper end part of a control link 48 is pivotally connected.

The control link 48 is disposed to have a rising gradient towards the front when the retractable roof 2 is in its in-use position. The control link 48 has through holes formed at its upper and lower end parts. The control link 48 is fixed to the mounting through hole in the upper end part of the front roof bracket 413 by means of a bolt or the like with a bush inserted in this through hole. Thus, the control link 48 is pivotally movable relative to the front roof panel 21 about an axis extending in the vehicle widthwise direction. In other words, the control link 48 is pivotally connected to the front roof panel 21.

The first link lever 45a has a mounting hole formed in the middle thereof. The lower end part of the control link 48 is pivotally connected to this mounting hole of the first link lever 45a. Specifically, the control link 48 is fixed at its lower end part to the middle part of the first link lever 45a by means of a bolt or the like with a bush inserted in this through hole. Thus, the control link 48 is pivotally movable relative to the first link lever 45a about an axis extending in the vehicle widthwise direction. In other words, the control link 48 is pivotally connected to the secondary four-bar link 45.

Figure 6:
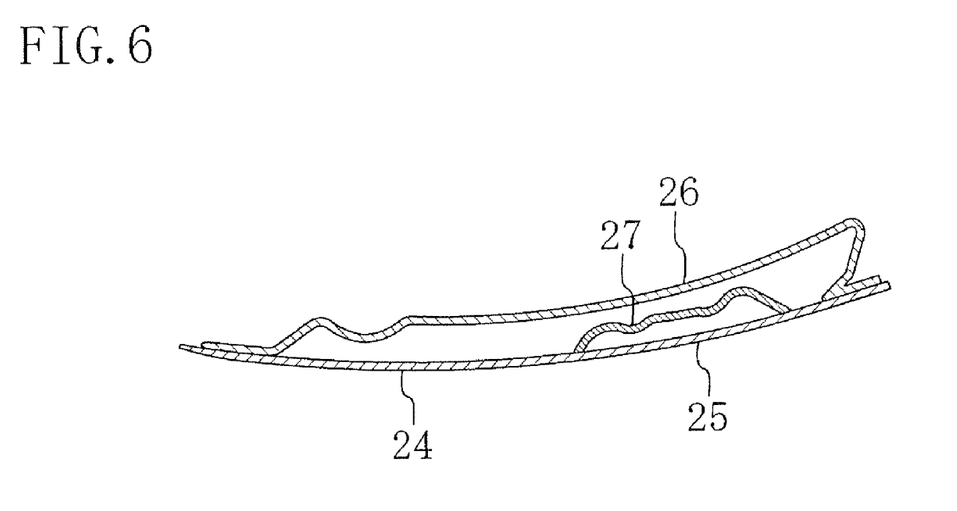
FIG. 6 is a sectional view taken along the line VI-VI in FIG. 5.
Figure 7:
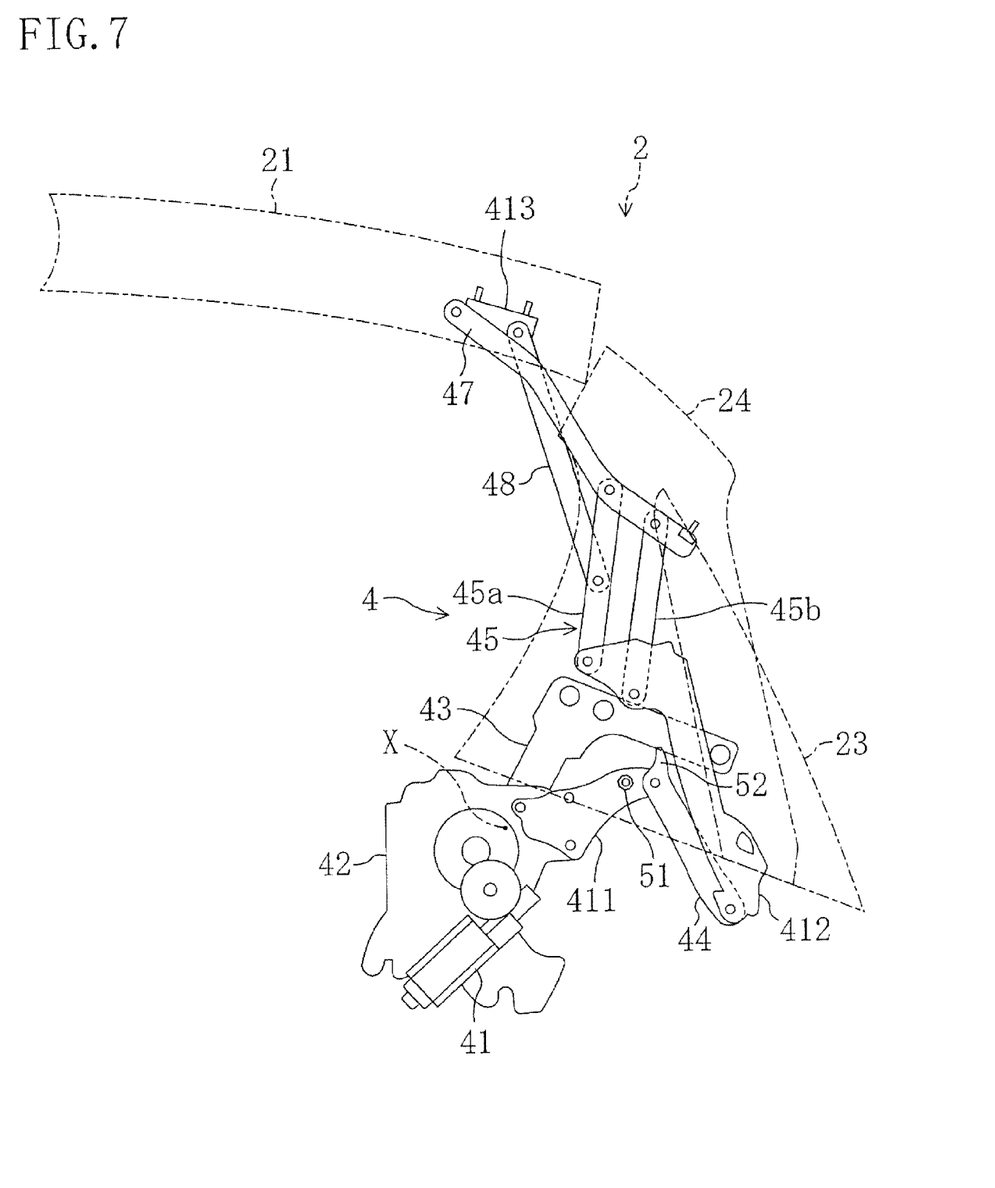
FIG. 7 is a side view showing the linkage mechanism of the retractable roof at a position between the in-use position and the storage position.
Figure 8:
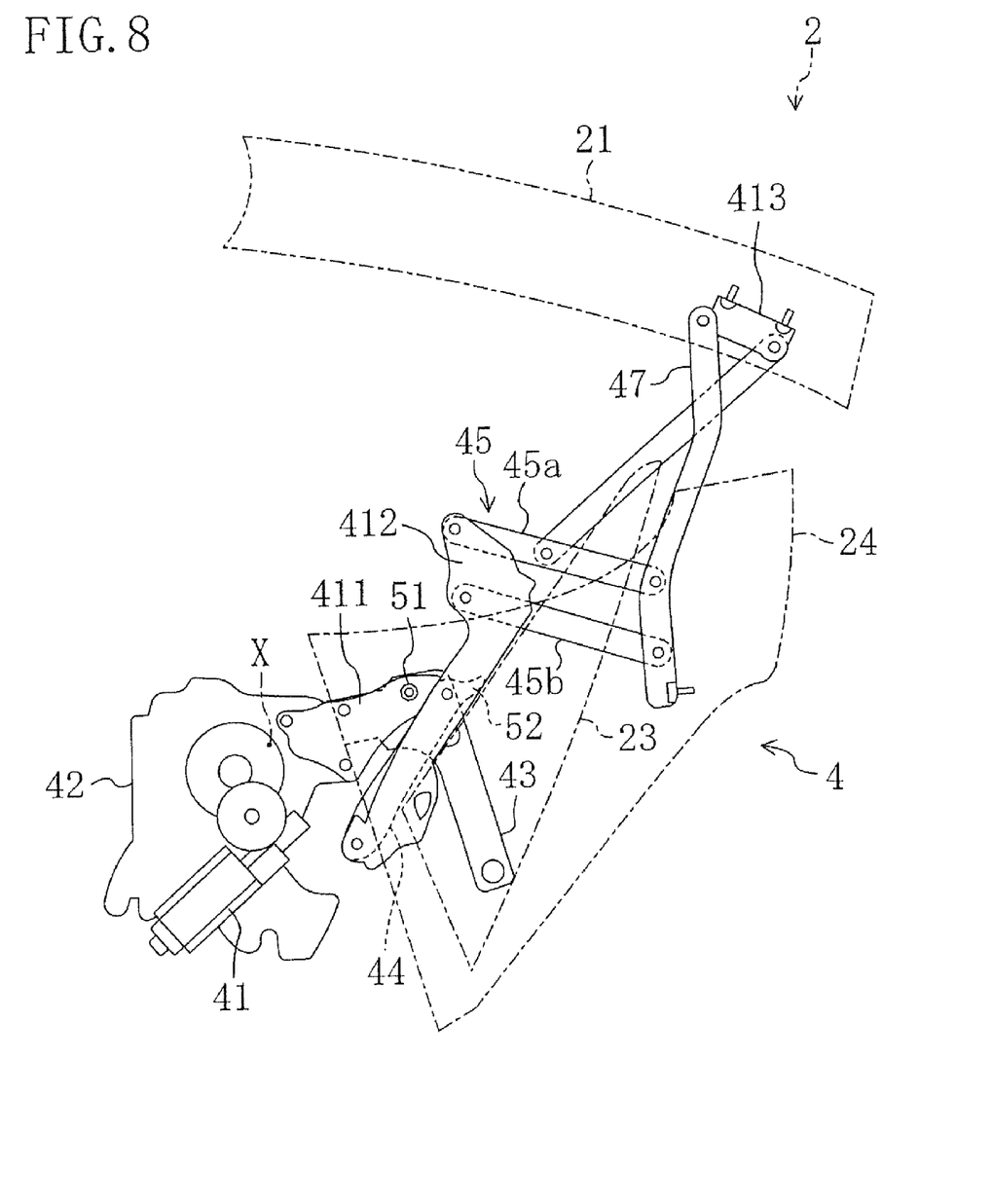
FIG. 8 is a side view showing the linkage mechanism of the retractable roof at a position between the in-use position and the storage position.

A detailed description will be given here of the connection structure of the middle roof panel 24 with the upper and lower arms 47 and 43 with reference to FIG. 5 and FIG. 6.

As described above, the middle roof panel 24 includes the outer panel layer 25, the inner panel layer 26, and the reinforcement 27 placed between the outer and inner panel layers 25 and 26. The upper and lower arms 47 and 43 are rigidly connected to the reinforcement 27.

The reinforcement 27 is substantially in a plate shape having a predetermined wave form in section. In the vicinity of the upper end thereof, two upper fixing parts 27a, 27b are formed to which the upper arm 47 is fixed. While in the vicinity of the lower end thereof, a lower fixing part 27b is formed to which the lower arm 43 is fixed. The upper fixing parts 27a and the lower fixing part 27b are exposed inside the passenger compartment 13.

Two fixed parts 47a and 47a are formed at the rear part of the upper arm 47. The two fixed parts 47a and 47a are located at the front and the rear of the two mounting holes of the upper arm 47 at which the first and second link levers 45a and 45b are pivotally connected, respectively. The fixed parts 47a and 47a are fixed to the upper fixing parts 27a and 27a of the reinforcement 27, respectively, by means of bolts or the like, whereby the upper arm 47 is rigidly connected to the reinforcement 27.

Furthermore, the fixed part 43b of the lower arm 43 is fixed to the lower fixing part 27b of the reinforcement 27 by means of a bolt or the like, whereby the lower arm 43 is rigidly connected to the reinforcement 27.

Reference numeral 414 in FIG. 5 denotes a cover attached to the upper arm 47 to cover it from below. The cover 414 prevents the upper arm 47 from being exposed to the passenger compartment 13, thereby improving the appearance of the passenger compartment 13.

As described above, the middle roof panel 24 is pivotally connected through the upper arm 47 to the front roof panel 21 and pivotally connected through the lower arm 43 to the main bracket 42. Thus, the middle roof panel 24 functions as one of the pair of links constituting part of a four-bar link. Furthermore, this segmental link functions as a drive link of the four-bar link because the lower arm 43 is driven by the drive motor 41.

On the other hand, the other (a driven link) of the pair of links as part of the four-bar link is constituted by the window link lever 44, the back window 23 (the window bracket 412), the first and second link levers 45a and 45b, and the control link 48.

The retractable roof 2 having the above structure moves as shown in FIG. 3 and FIG. 7 to FIG. 9 to change its position from the in-use position to the storage position. Note that FIG. 3, FIG. 9, FIG. 7, and FIG. 8 show the retractable roof 2 in its in-use position (in the in-use state), that in its storage position (in the storage state), that when approximately one third of the position change process of the retractable roof 2 from its in-use position to its storage position has passed, and that when approximately two thirds of the position change process have passed, respectively.

When the drive motor 41 starts to be driven, the speed reduction gear 43c amplifies the torque so that the lower arm 43 starts to turn about the pivot axis X clockwise in FIG. 3. Accompanied by the turning of the lower arm 43, the middle roof panel 24 starts to turn clockwise (see FIG. 3 and FIG. 7).

Accompanied by the turning of the middle roof panel 24, the front roof panel 21 pivotally connected to the middle roof panel 24 (through the upper arm 47) moves rearward and diagonally upward. The movement of the front roof panel 21 is restricted to a specified path because the control link 48 is pivotally connected to the front roof panel 21, in other words, because the four-bar link is formed between the front roof panel 21 and the main bracket 42.

In addition, accompanied by the turning of the middle roof panel 24, the middle roof panel 24 and the back window 23 relatively move, following the operation of the secondary four-bar link 45. Specifically, the back window 23 turns rearward while moving frontward relative to the middle roof panel 24 turning rearward.

When the drive motor 41 continues to be driven, the middle roof panel 24 further turns and is substantially laid down (see FIG. 8) while the front roof panel 21 further moves rearward and is then positioned above the middle roof panel 24.

When the drive motor 41 further continues to be driven, the middle roof panel 24 further turns rearward to be stowed into the storage room 12 (see FIG. 9). In association therewith, the front roof panel 21 moves downward and is then stowed into the storage room 12 to be positioned just above the middle roof panel 24 therein. Thus, the front and middle roof panels 21 and 24 lie one over the other. On the other hand, the back window 23 is brought into a superposed relationship with the middle roof panel 24 as viewed along an axis extending in the vehicle widthwise direction.

For changing the retractable roof 2 from its storage position to its in-use position, the retractable roof 2 moves in the reverse manner to that as described above.

In the above retractable roof 2, the middle roof panel 24 functions as one of the pair of links constituting part of the four-bar link which lie between the front roof panel 21 and the main bracket 42. Thus, the number of link members disposed in the passenger compartment 13 is reduced by one as compared with that in the conventional retractable roof, which saves the weight of the retractable roof 2.

Particularly, the upper arm 47 on the middle roof panel 24 is pivotally connected to the front roof bracket 413 at a point closer to the vehicle front than the control link 48 so that the middle roof panel 24 constitutes, as part of the four-bar link, the front side link of the pair of links arranged alongside each other in the vehicle front-to-rear direction. Accordingly, there is no link member largely protruding into the passenger compartment 13 when the retractable roof 2 is in its in-use position. In addition, the rear side link of the pair of links is disposed away from the passengers.

Furthermore, the rear side link is constituted by the window link lever 44, the back window 23 (the window bracket 412), the first and second link levers 45a and 45b, and the control link 48. Since the rear side link is constituted in this manner by a plurality of relatively short link members connected to each other, there is no need to provide a single long link member for connecting the front roof panel 21 to the main bracket 42. This also prevents any link member from protruding into the passenger compartment 13, thereby extending the space of the passenger compartment 13 vertically. In addition, the elimination of the need to provide a single long link member is advantageous in weight saving of the retractable roof 2.

The middle roof panel 24 functioning as one of the links of the four-bar link eliminates the need to arrange a pair of link members of the four-bar link spaced apart from each other in the vehicle widthwise direction. Thus, the space of the passenger compartment 13 can be extended in the vehicle widthwise direction.

As described above, the space of the passenger compartment 13 is extended in the vertical direction and in the vehicle widthwise direction to improve the comfortableness in the passenger compartment 13.

The back window 23 is movable relative to the middle roof panel 24 and, in a storage position of the retractable roof 2, is superposed on the middle roof panel 24 as viewed along an axis extending in the vehicle widthwise direction. Therefore, the retractable roof 2 can be vertically downsized in the storage room 12, and in turn, the storage room 12 can be downsized.

The synchronization of the position change operation of the retractable roof 2 with the relative movement of the back window 23 to the middle roof panel 24 is realized by pivotal connection of the control link 48 to the first link lever 45a. In other words, the control link 48 contributes to both the position change operation of the retractable roof 2 and the relative movement of the back window 23 to the middle roof panel 24. This eliminates the need to provide an additional link member for only synchronizing the above position change operation with the above relative movement. This is advantageous in space widening of the passenger compartment 13, in reduction in the number of components, and in weight saving.

In the thus structured retractable roof 2, though not shown, shealings are interposed between the front and middle roof panels 21 and 24 and between the back window 23 and the middle roof panel 24. In the in-use state of the retractable roof 2, as shown in FIG. 3, the reactive force of the shealings works frontward on the upper end part of the back window 23 while working upward on the rear end part of the front roof panel 21 (see the arrows by a solid line in FIG. 3)

The linkage mechanism 4, which receives the reactive force, is comparatively low in rigidity because it includes another four-bar link (the secondary four-bar link 45) in addition to the four-bar link between the front roof panel 21 and the main bracket 42.

Accordingly, a desirable geometry may not be formed, thereby resulting in formation of a step between the back window 23 and the middle roof panel 24 in some cases.

To tackle this problem, the linkage mechanism 4 of the retractable roof 2 includes an adjusting mechanism 5 for adjusting the geometry in the in-use state of the retractable roof 2.

Figure 10:
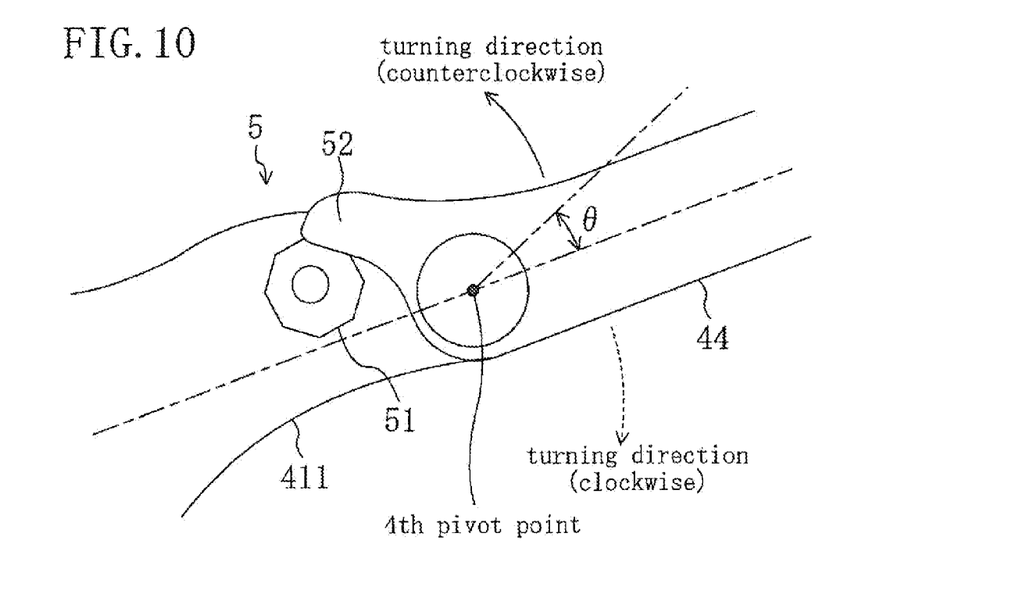
FIG. 10 is an enlarged view showing a joint part of a window link lever and a window bracket base to which an adjusting mechanism is mounted.

The adjusting mechanism 5 includes an eccentric stopper 51 attached to the window bracket base 411 and a lever flange part 52 integrally formed with the window link lever 44, as shown in FIG. 4 and FIG. 10.

The eccentric stopper 51 is a nut having an octagonal outer contour of which screw hole is displaced from the center of the outer contour. Accordingly, the distances between the center of the screw hole and the sides of the octagonal contour are different from each other. The eccentric stopper 51 is attached to the rear end part of the window bracket base 411 by means of a bolt so as to be rotatable about an axis extending in the vehicle widthwise direction.

The lever flange part 52 is formed to protrude frontward from the front end of the window link lever 44 so that the lower face of the lever flange part 52 is in contact, in the in-use state, with the outer peripheral face of the eccentric stopper 51 attached to the window bracket base 411 at a point on the opposite side of the pivot point of the window bracket base 411 and the window link lever 44 to the window link lever 44 (see FIG. 3 and FIG. 10).

In the adjusting mechanism 5 structured as above, the eccentric stopper 51 is rotated in the in-use state of the retractable roof 2 to change the distance between the face (contact face) of the eccentric stopper 51 in contact with the window link lever 44 and the rotation axis of the eccentric stopper 51.

Herein, the reactive force of one of the aforementioned shealings works as an anticlockwise turning force on the window link lever 44 (see the arrow by the solid line in FIG. 3). In contrast, change in distance between the contact face and the rotation axis of the eccentric stopper 51 provides to the window link lever 44 a clockwise turning force against the above turning force (see the arrow by the broken line in FIG. 3). This changes the angle of the turning direction of the window link lever 44 in the in-use state.

Accompanied by the change in angle of the turning direction of the window link lever 44, the window bracket 412 pivotally connected to the window link lever 44 changes in its position. Specifically, when the angle of the turning direction of the window link lever 44 is changed clockwise, the upper end of the window bracket 412 moves rearward. Also, accompanied by the change in angle of the turning direction of the window link lever 44, the control link 48 connected through the window bracket 412 and the secondary four-bar link 45 to the window link lever 44 changes in its position. Namely, When the angle of the turning direction of the window link lever 44 is changed clockwise, the front end of the control link 48 moves downward.

In this way, the adjusting mechanism 5 adjusts the geometry in the in-use state of the linkage mechanism 4. This geometry adjustment brings positional change of the window bracket 412 to adjust the position of the back window 23. As a result, the step between the back window 23 and the middle roof panel 24 if formed is canceled.

Thus, the adjusting mechanism 5 can adjusts displacement of the back window 23 with the retractable roof 2 left mounted to the vehicle 1.

In order to perform adjustment using the shim on the present retractable roof 2 (without the adjusting mechanism 5), the following steps are necessary. Namely, a displace amount between the back window 23 and the middle roof panel 24 is checked after the retractable roof 2 is mounted to the vehicle 1; the back window 23 is taken off from the window bracket 412; the shim corresponding to the checked displace amount is disposed between the back window 23 and the window bracket 42; and then, the back window 23 is fixed again to the window bracket 412.

In contrast, the adjusting mechanism 5 can adjust displacement of the back window 23 by only rotating the eccentric stopper 51. This accordingly facilitates the adjusting operation remarkably to improve the workability remarkably.

The eccentric stopper 51 is a nut having an octagonal outer contour in the above embodiment, but the outer contour of the eccentric stopper is not limited thereto and may be another polygonal form or a circular form.

The position where the eccentric stopper 51 is attached is not limited to the rear end part of the window bracket base 411 as in the above embodiment and may be anywhere as long as it is in contact with the window link lever 44 to allow the angle of the turning direction in its in-use state to be changeable.

Further, the adjusting mechanism 5 is not limited to a mechanism for adjusting the angle of the turning direction of the window link lever 44 and may be a mechanism for adjusting the angle of the turning direction of another link, for example, the first and second link levers 45a, 45b.

The control link 48 is pivotally connected to the first link lever 45a in the above embodiment. Alternatively, even when the control link 48 is pivotally connected to the second link lever 45b, the retractable roof 2 can move just the same as above. As well, when the control link 48 is pivotally connected to the window bracket 412, the retractable roof 2 can move just the same as above. Wherein, the pivotal connection of the control link 48 with the front side first link lever 45a shortens the length of the control link 48 to suppress protrusion of the link member.

While the middle roof panel 24 functions as a link in the above embodiment, another link functioning as one of the pair of links constituting part of the four-bar link may be provided additionally.

In addition, the drive source of the linkage mechanism 4 is not limited to the motor 41 and may be another rotation actuator or an expansion actuator, such as a hydraulic cylinder or the like.

INDUSTRIAL APPLICABILITY

As described above, the present invention can adjust the position of the roof member by the adjusting mechanism for adjusting the geometry in the in-use state of the linkage mechanism to improve the workability and is therefore useful as a retractable roof boarded on a vehicle.

The invention claimed is:
1. A retractable roof, comprising:
a roof for covering a passenger compartment;
a linkage mechanism for alternately changing a position of the roof between an in-use position in which the roof covers the passenger compartment and a storage position in which the roof is stowed in a storage room formed at the rear of the passenger compartment to open the passenger compartment, the linkage mechanism including a plurality of links pivotally connected to each other, thereby including four pivot points; and
an adjusting mechanism for adjusting, in an in-use state when the roof is in the in-use position, a position in the in-use state of a plurality of links included in the linkage mechanism by changing an angle of a turning direction of a predetermined link included in the linkage mechanism.

2. The retractable roof of claim 1, wherein
the adjusting mechanism includes a rotating member which is attached pivotally about a predetermined rotation axis to one of two links included in the linkage mechanism and pivotally connected to each other and which has an outer peripheral face in contact with the other of the two links in the in-use state, the rotation axis of the rotating member being eccentric to the center of the outer peripheral face, and
the adjusting mechanism rotates the rotating member to change a distance between the face in contact with the other link and the rotation axis, thereby changing an angle of a turning direction of the other link in the in-use state.

3. The retractable roof of claim 2, wherein
the other link includes a lever flange part integrally formed therewith in the vicinity of a pivot point thereof, and
the rotating member is in contact with the lever flange part on an opposite side of the pivot point to the other link.

4. The retractable roof of claim 1, wherein
the roof includes a front roof panel for covering the passenger compartment from above, a back window for covering a rear part of the passenger compartment, and a middle roof panel disposed between the back window and the front roof panel,
the linkage mechanism includes: a window link lever pivotally connected to the back window and a car body side member; and a pair of link levers pivotally connected to the back window and the middle roof panel to constitute a four-bar link, and
the adjusting means changes an angle of a turning direction of the window link lever in the in-use state.

5. The retractable roof of claim 4, wherein
the linkage mechanism further includes:
a control link pivotally connected to one of the pair of link levers or the back window and pivotally connected to the front roof panel; and
a main link pivotally connected to the front roof panel and the car body side member.

6. A vehicle comprising a retractable roof, wherein
the retractable roof includes:
a plurality of roof members for covering a passenger compartment;
a linkage mechanism for alternately changing a position of the roof members between an in-use position in which the roof members cover the passenger compartment and a storage position in which the roof members are stowed in a storage room formed at the rear of the passenger compartment to open the passenger compartment, the linkage mechanism including a plurality of links pivotally connected to each other, thereby including four pivot points; and an adjusting mechanism for adjusting, in an in-use state when the roof members are in the in-use position, a position in the in-use state of a plurality of links included in the linkage mechanism by changing an angle of a turning direction of a predetermined link included in the linkage mechanism.

* * * * *